(12) United States Patent
Takeda

(10) Patent No.: US 7,050,372 B2
(45) Date of Patent: May 23, 2006

(54) OPTICAL DISK DEVICE CONFIGURED TO RELIABLY REPRODUCE ADDRESS INFORMATION

(75) Inventor: Naoto Takeda, Tokyo (JP)

(73) Assignee: TEAC Corporation, Musashino (JP)

( * ) Notice: Subject to any disclaimer, the term of this patent is extended or adjusted under 35 U.S.C. 154(b) by 375 days.

(21) Appl. No.: 10/254,482

(22) Filed: Sep. 25, 2002

(65) Prior Publication Data

US 2003/0063534 A1    Apr. 3, 2003

(30) Foreign Application Priority Data

Sep. 28, 2001 (JP) .............................. 2001-303718

(51) Int. Cl.
*G11B 7/005* (2006.01)

(52) U.S. Cl. .................................. 369/47.22
(58) Field of Classification Search .............. 369/47.22
See application file for complete search history.

(56) References Cited

U.S. PATENT DOCUMENTS

| | | | |
|---|---|---|---|
| 5,696,742 A * | 12/1997 | Ogata et al. ............. | 369/47.22 |
| 6,195,320 B1 * | 2/2001 | Furumiya et al. .......... | 369/47.2 |
| 6,292,446 B1 * | 9/2001 | Watabe ...................... | 369/53.2 |
| 6,400,662 B1 * | 6/2002 | Choi et al. ................ | 369/44.28 |

FOREIGN PATENT DOCUMENTS

| | | |
|---|---|---|
| JP | 60-256928 | 12/1985 |
| JP | 11-273084 | 10/1999 |
| JP | 2000-082259 | 3/2000 |
| JP | 2000-200468 | 7/2000 |
| JP | 2001-176092 | 6/2001 |

OTHER PUBLICATIONS

MAT (machine assisted translation) of 2001-176092.*

* cited by examiner

*Primary Examiner*—A M Psitos
(74) *Attorney, Agent, or Firm*—Christensen O'Connor Johnson Kindness PLLC

(57) ABSTRACT

An optical disk device which reproduces address information embossed and formed on an optical disk. Return light of laser light is detected by a photodetector which is split into at least two components along the radial direction and signals representing the return light are output. Address information is reproduced by selectively switching between a summation signal and a difference signal between two signals. When there is a focus deviation, the summation signal of two signals is used to reproduce the address information and when the optical disk is tilted, the difference signal of two signals is used to reproduce the address information.

1 Claim, 11 Drawing Sheets

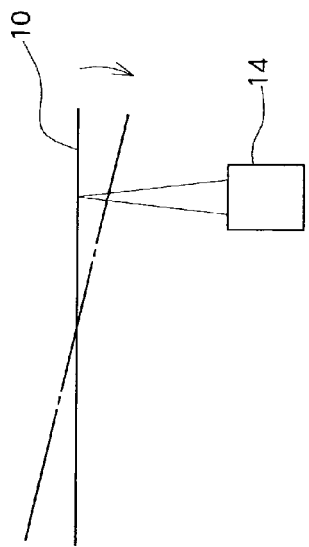
Fig. 11A RELATED ART
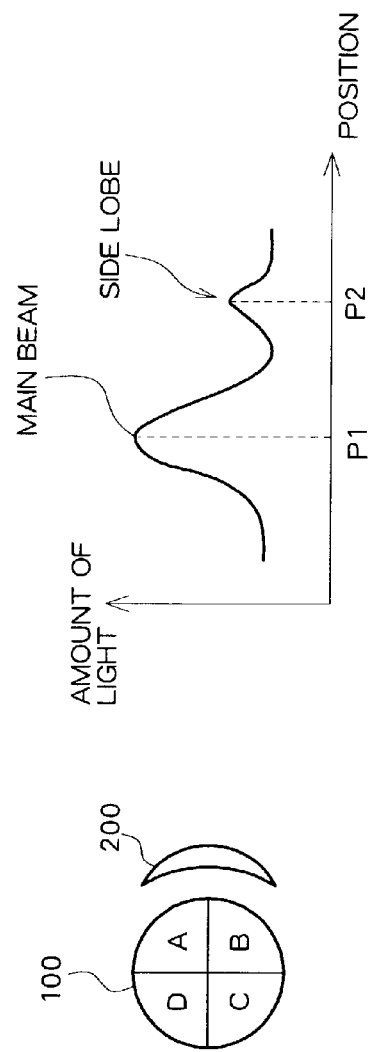
Fig. 11C RELATED ART
Fig. 11B RELATED ART

OPTICAL DISK DEVICE CONFIGURED TO RELIABLY REPRODUCE ADDRESS INFORMATION

BACKGROUND OF THE INVENTION

1. Field of the Invention

The present invention relates to an optical disk device, and in particular, to reproduction of address information from an optical disk onto which the address information is formed in advance, such as a DVD-RAM.

2. Description of the Related Art

In an optical disk such as a DVD-RAM, a header section and a data section are formed within a sector. Address information are embossed and formed in the header section to allow random accessing.

FIG. 7 schematically shows a structure of a sector in a DVD-RAM. One sector comprises a header section and a data section. Four items of address information, ID1, ID2, ID3, and ID4 are embossed and formed in the header section. The address information of the sector can be obtained by replaying any one of the address information ID1–ID4. The address information ID1 and ID2 are formed at positions identical to each other with respect to the radial direction (first group of emboss data) and the address information ID3 and ID4 are formed at positions identical to each other with respect to the radial direction (second group of emboss data). The address information ID1 and ID2 and the address information ID3 and ID4 are formed at positions separated from each other in the radial direction. As shown in FIG. 7, when a spot 100 of laser light from an optical pickup moves to the right in FIG. 7 (when the optical disk is rotated and moved to the left), the address information ID1 and ID2 are first detected and then the address information ID3 and ID4 are detected. In a DVD-RAM, in order to improve the writing density, data is written on lands and grooves. On a land, the address information ID1 and ID2 appear at radially inward positions while the address information ID3 and ID4 appear at radially outward positions. On the other hand, on a groove, the address information ID1 and ID2 appear at radially outward positions while the address information ID3 and ID4 appear at radially inward positions. Therefore, because the detected positions of the address information differ for the case of a groove and for the case of a land, the land and groove can be differentiated from each other based on this difference in relative position.

FIG. 7 also shows an arrangement of four-segment photodetectors for converting return light into an electrical signal. The four-segment photodetectors comprises four detectors, A, B, C, and D and is a photodetector split into two components in the radial direction, into (A+D) and (B+C). In the on-track state on the land, the (A+D) photodetector detects address information ID1 and ID2 and the (B+C) photodetector detects address information ID3 and ID4. On the other hand, in the on-track state on the groove, the (A+D) photodetector detects address information ID3 and ID4 and the (B+C) photodetector detects address information ID1 and ID2.

FIG. 8 shows a signal representing (A+B+C+D) which is the total sum of the signals from the components A, B, C, and D of the four-segment photodetectors, that is, a signal representing the sum of two signals from the (A+D) photodetector and from (B+C) photodetector which are split into two in the radial direction. Because the laser spot 100 detects the address information ID1, ID2, ID3, and ID4 in that order, in the summation signal, a signal representing ID1 (ID1 signal), a signal representing ID2 (ID2 signal), a signal representing ID3 (ID3 signal), and a signal representing ID4 (ID4 signal) appear in that order. Because this signal is a summation signal, the polarity of all of the ID1, ID2, ID3, and ID4 signals are identical.

On the other hand, FIGS. 9 and 10 respectively show a difference signal between the (A+D) signal and (B+C) signal from the two photodetectors split into two in the radial direction, that is, a signal representing (A+D)−(B+C). FIG. 9 shows a difference signal in a groove sector. In a groove, the (B+C) detector detects the address information ID1 and ID2 and the (A+D) detector detects the address information ID3 and ID4, and thus, in the difference signal, the polarity of the ID1 and ID2 signals detected by the (B+C) detector is inverted.

FIG. 10 shows a waveform of a difference signal in a land sector. In a land, the (A+D) detector detects the address information ID1 and ID2 and the (B+C) detector detects the address information ID3 and ID4, and thus, in the difference signal, the polarity of the ID3 and ID4 signals is inverted.

In this manner, the address information ID1–ID4 can be obtained using either a summation signal or a difference signal, and thus, the address information of a DVD-RAM can be replayed. When the data section is to be replayed using a summation signal, the polarity of the signals representing the address information must be matched with the polarity of the summation signal. Therefore, when the address information is reproduced using a difference signal, the address information must be replayed with the polarity of ID1 and ID2 signals inverted on the groove sector and, similarly, on the land sector, the address information must be replayed with the polarity of ID3 and ID4 signals inverted. On the other hand, when the address information is reproduced using the summation signal, the polarity inverting process is not necessary.

As described, because the address information can be reproduced using either the summation signal or the difference signal of signals from two photodetectors, of the four-segment photodetectors, split into two in the radial direction, in conventional drives, the signal to be used is fixed to either the summation signal or the difference signal in the processing circuits for reproducing the address information. However, the present applicants have found that in some cases the address information cannot be reliably reproduced by fixing the signal to be used in this manner.

For example, in optical disk devices, there may be cases where a focus deviation occurs due to variation in precision during assembly of the optical pickup or the drive, insufficient adjustment of the focus offset, etc. When such focus deviation occurs, the shape of the laser light spot to be irradiated onto the optical disk is changed and the balance among the amounts of light from the four-segment photodetectorss A–D is disrupted. Because of this, even when the address information is to be reproduced using the difference signal, the in-phase noise cannot be removed, and in addition, an address reproduction error is generated by a phase change due to the difference calculation.

As shown in FIG. 11A, when the optical axis of the laser light irradiated from an optical pickup 14 is inclined with respect to the optical disk 10 ("tilt"), in addition to a main spot 100 which is the actual spot, a side lobe 200 appears near the main spot 100 as shown in FIG. 11B. In this case, as shown in FIG. 11C, a peak P2 appears in addition to the actual peak P1 in the distribution of the amount of light detected by the four-segment photodetectors. When address information is reproduced using a summation signal in this case, the resolution may be degraded or the phase may be changed because of the influence from the side lobe 200, and address reproduction error may occur similar to the above. In other words, regardless of whether a summation signal or a difference signal is used, an address reproduction error may be generated as long as the type (summation or difference) of the used signal is fixed.

SUMMARY OF THE INVENTION

Accordingly, an object of the present invention is to provide an optical disk device in which the address information formed on the optical disk in advance can be reliably reproduced.

In order to achieve at least the object mentioned above, according to one aspect of the present invention, there is provided an optical disk device comprising means for irradiating laser light onto an optical disk; means for detecting return light from the optical disk, the means for detecting return light being divided into at least two means along the radial direction of the optical disk; and means for reproducing address information of the optical disk while selectively switching between a summation signal and a difference signal of two signals from the means for detecting return light. According to the present invention, rather than fixedly using either one of the summation signal or the difference signal, the signals to be used is selectively switched between the summation signal and the difference signal. Because of this, it is possible to reliably reproduce the address information.

According to another aspect of the present invention, it is preferable that the optical disk device further comprises means for detecting amplitude of each address signal contained in each of two signals from the means for detecting return light, and means for comparing the amplitudes of the two detected address signals. The means for reproduction selectively switches between the summation signal and the difference signal based on the comparison result by the comparing means.

According to another aspect of the present invention, it is preferable that the optical disk device further comprises means for detecting focus deviation of laser light irradiated from the means for irradiating and means for comparing the focus deviation with a predetermined value. The means for reproducing selectively switches between the summation signal and the difference signal based on the comparison result by the comparing means. When a focus deviation occurs, a difference occurs between the amplitude levels of two signals, and thus, a phase change occurs when the difference signal between two signals is employed because the in-phase noise cannot be eliminated. Therefore, when a focus deviation is present, it is preferable to use a summation signal and not use the difference signal.

According to yet another aspect of the present invention, it is preferable that the optical disk device further comprises means for detecting an inclination between the optical axis of laser light irradiated from the means for irradiating and the optical disk; and means for comparing the inclination with a predetermined value. The means for reproduction selectively switches between the summation signal and the difference signal based on the comparison result by the comparing means. When the summation signal is used while a tilt is present, a phase change occurs because of a side lobe. Therefore, when a tilt is present, it is preferable to use the difference signal and not use the summation signal.

While the present invention will be more clearly understood with reference to the following embodiments, the scope of the present invention is not limited to the embodiments.

BRIEF DESCRIPTION OF THE DRAWINGS

FIG. 11A is a diagram for explaining a tilt of an optical disk.

FIG. 11B is a diagram for explaining a laser light spot in a tilted state.

FIG. 11C is a graph showing a relationship between the position shown in FIG. 11B and amount of laser light.

DESCRIPTION OF PREFERRED EMBODIMENTS

Figure 7:
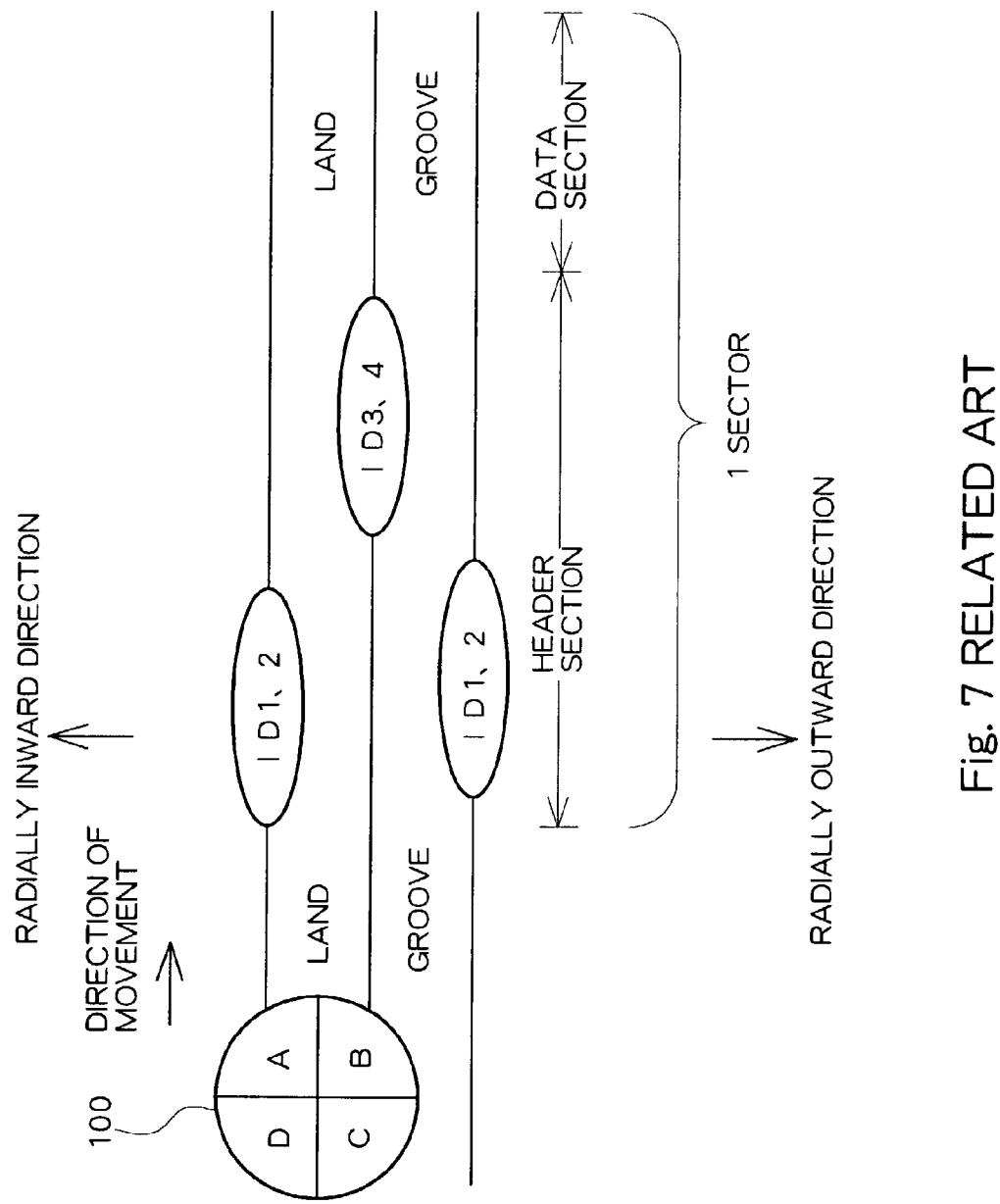
FIG. 7 is a diagram for explaining address information of a DVD-RAM.
Figure 8:
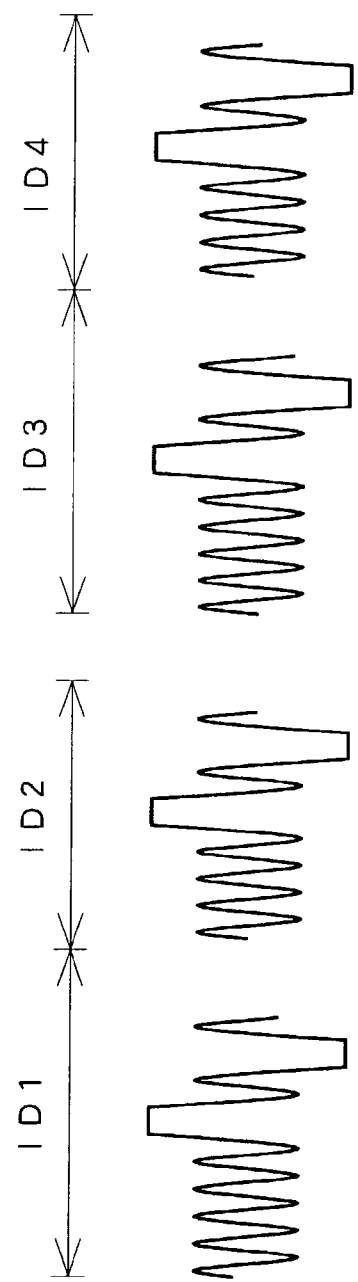
FIG. 8 is a diagram for explaining a waveform of a summation signal.
Figure 9:
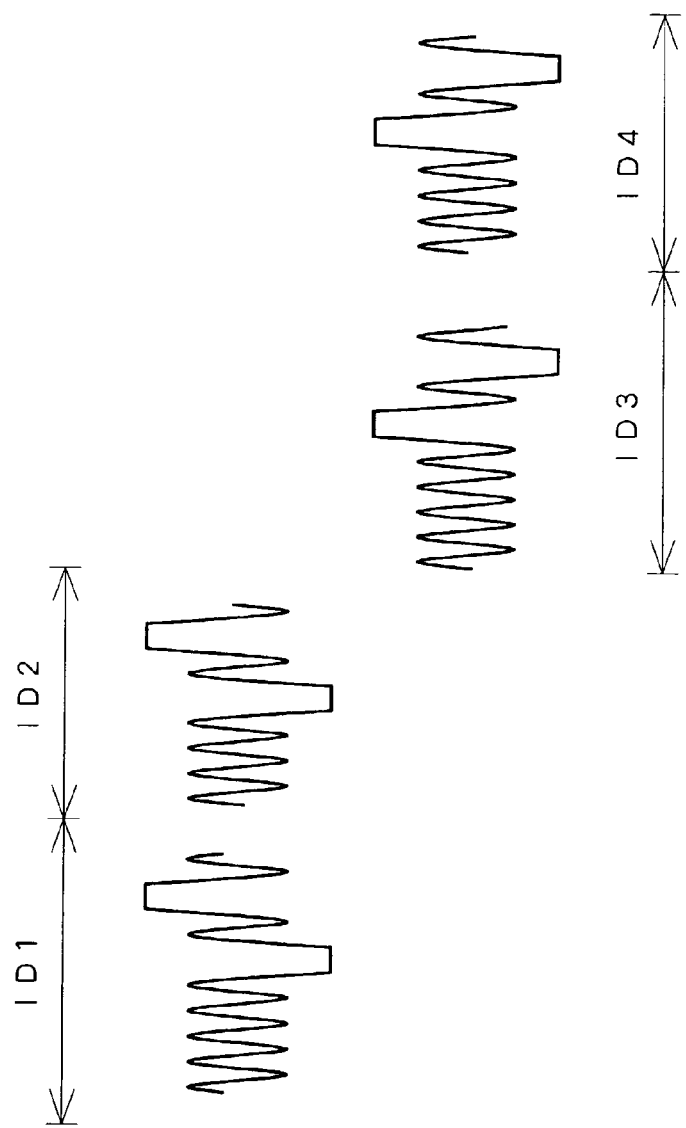
FIG. 9 is a diagram for explaining a waveform of a difference signal on a groove.
Figure 10:
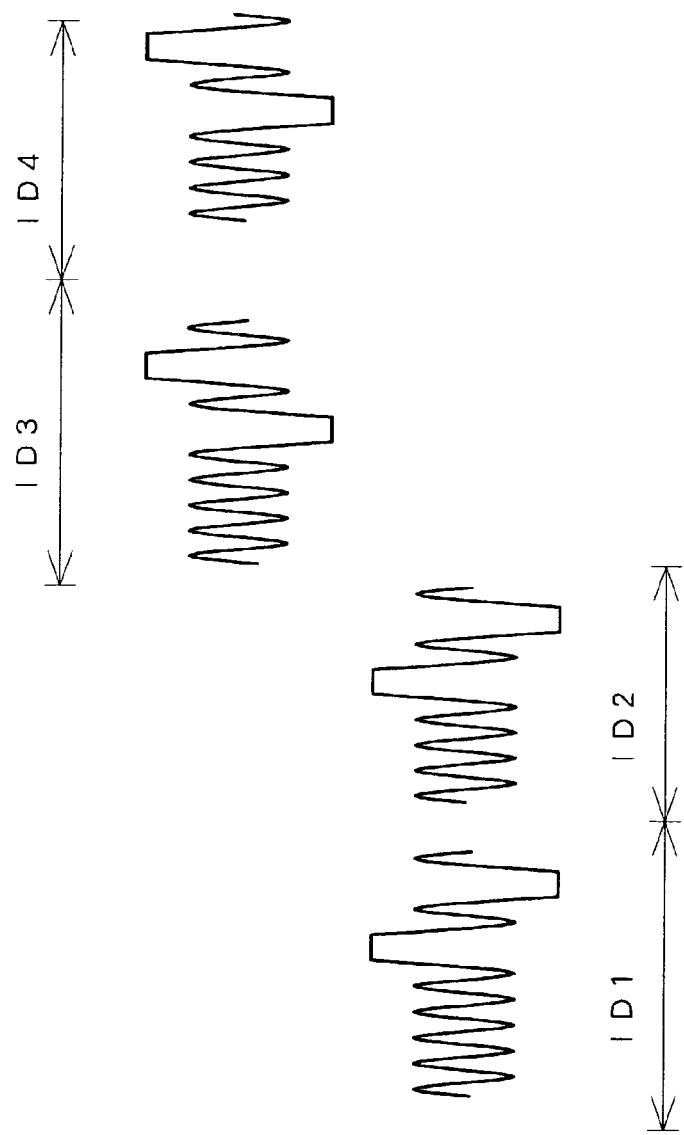
FIG. 10 is a diagram for explaining a waveform of a difference signal on a land.

Preferred embodiments of the present invention will now be described with reference to the drawings. The optical disk used in the preferred embodiments is an optical disk onto which ID1–ID4 are embossed and formed as address information as shown in FIG. 7.

Figure 1:
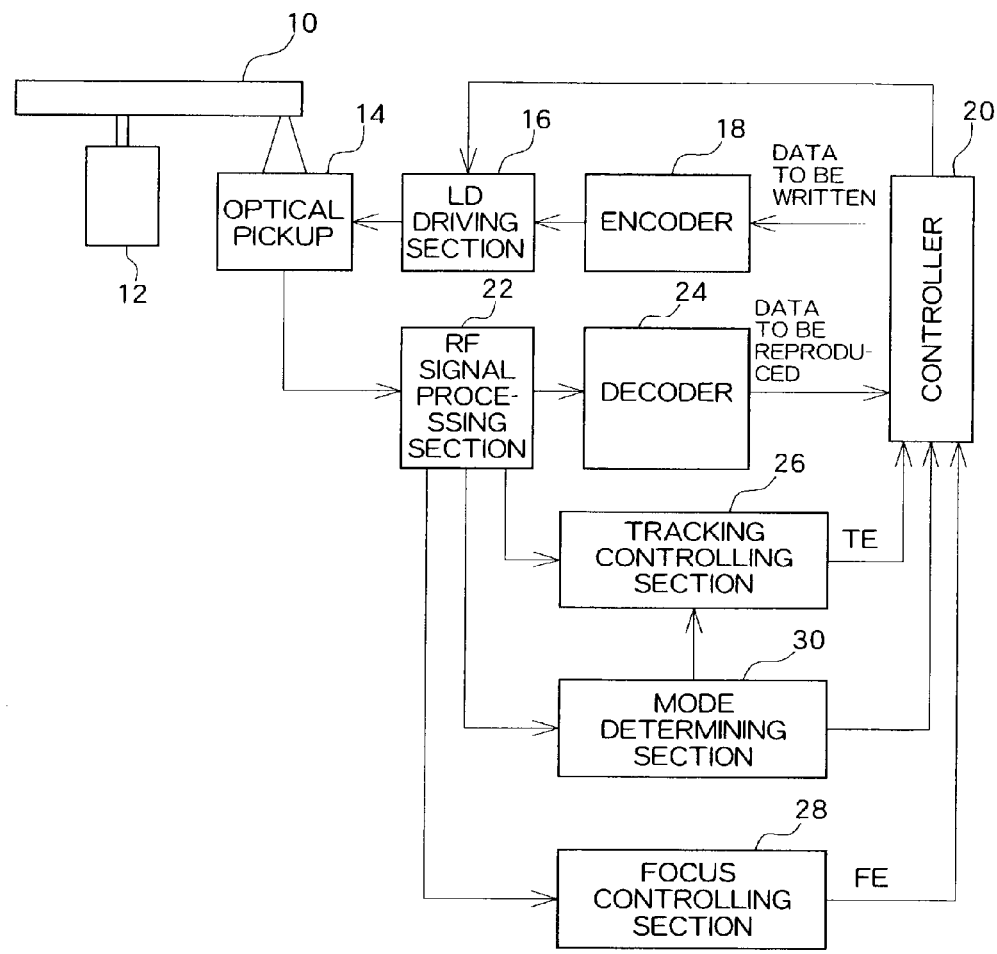
FIG. 1 is a structural block diagram of an optical disk device.

FIG. 1 is a block diagram showing a structure of an optical disk device according to the embodiment. An optical disk 10 is rotationally driven by a spindle motor 12 through CAV (or CLV) method.

An optical pickup 14 is placed opposite to the optical disk 10, and irradiates laser light of a writing power onto the optical disk 10 to write data and laser light of a reproducing power onto the optical disk 10 to reproduce written data. During the writing process, data to be written from the controller 20 is modulated by an encoder 18 and is converted into a driving signal by an LD driving section 16. A laser diode (LD) of the optical pickup 14 is driven by the driving signal. During the replaying process, four-segment photodetectors within the optical pickup 14 converts the amount of return light into an electrical signal, the converted electrical signal is supplied to an RF signal processing section 22, and is demodulated by a decoder 24. Then, the signal is supplied to the controller 20 as the reproduced data. The arrangement of the four-segment photodetectors is identical to that shown in FIG. 7.

The RF signal processing section 22 comprises an amplifier, an equalizer, a binarizing section, and a PLL section, and boosts and binarizes an RF signal, generates a synchronous clock, and outputs both signals to the decoder 24. The decoder 24 demodulates the binarized signal using the synchronous clock. The signal to be demodulated includes address information in a header section and a data signal in a data section. The address information is decoded by selectively using a summation signal or a difference signal of replayed RF signals and the data signal is decoded using the summation signal of the reproduced RF signals. The determination of whether the address information is to be decoded using the summation signal or the difference signal is made by a mode determining section 30 which will be described below.

A tracking controlling section 26 generates a tracking error signal TE from the reproduced RF signals and supplies the tracking error signal TE to the controller 20. The tracking error signal can be generated using a DPD (differential phase detection) method or a push-pull method. In the present embodiment, the tracking servo function is provided in the controller 20 for the purpose of explanation, but it is also possible to provide a tracking servo circuit separately from the controller 20 and to supply the tracking error signal TE to the tracking servo circuit. It is also possible to provide a tracking offset section and to calculate the amount of tracking offset necessary for creating an on-track condition and to add the tracking offset to the tracking error signal.

A focus controlling section 28 generates a focus error signal FE from the reproduced RF signals and supplies the focus error signal FE to the controller 20. Similar to the tracking control, it is also possible to provide a focus servo circuit separately from the controller 20 and to supply the focus error signal FE to the focus servo circuit. It is also possible to provide a focus offset section and to calculate the amount of focus offset necessary for creating the in-focus condition and to add the focus offset to the focus error signal.

A mode determining section 30 dynamically determines, based on the TF signals from the RF signal processing section 22, whether to use a summation signal or to use a difference signal of the signals from the (A+D) photodetector and (B+C) photodetector which are split into two in the radial direction, for reproducing the address information, and supplies a signal representing the determination to the controller 20. Based on the signal from the mode determining section 30, the controller 20 controls decoding of address information by the decoder 24. That is, when the mode determining section 30 determines that a summation signal is to be used, the decoder 24 uses the summation signal to reproduce the address information. On the other hand, when the mode determining section 30 determines that a difference signal is to be used, the decoder 24 uses the difference signal to reproduce the address information. Because the data section is reproduced using the summation signal as described above, when the address information is reproduced using the difference signal, the decoder 24 uses the difference signal during decoding of the address information and switches to the summation signal during decoding of the data section. In the present embodiment, the following two processing modes may be present: a first mode in which the address information and data are both reproduced using the summation signal; and a second mode in which the address information is reproduced using the difference signal while data is reproduced using the summation signal.

Figure 2:
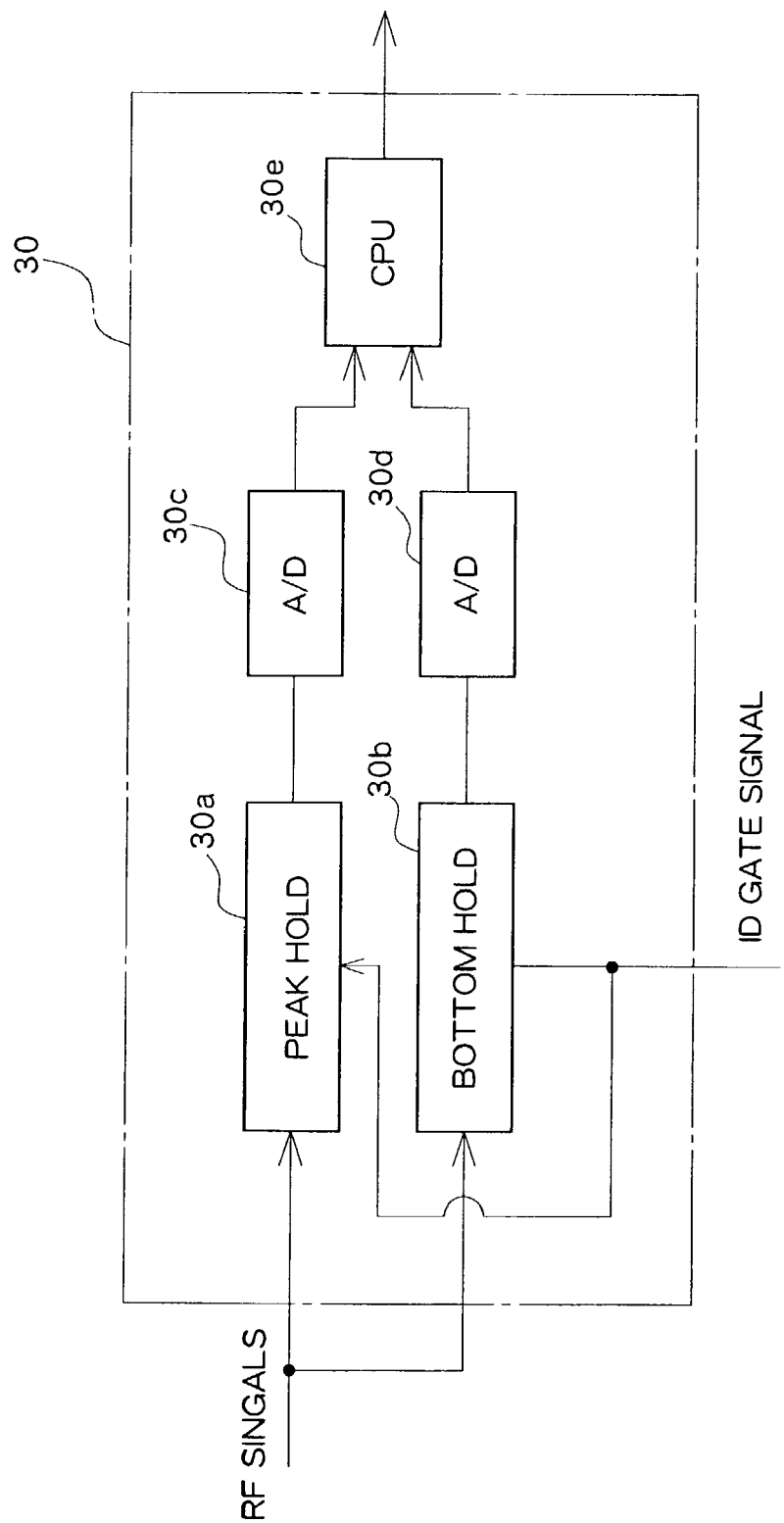
FIG. 2 is a structural block diagram of a mode determining section shown in FIG. 1.

FIG. 2 is a block diagram showing a structure of a mode determining section 30 shown on FIG. 1. The mode determining section 30 comprises a peak hold circuit 30a, a bottom hold circuit 30b, A/D converters 30c and 30d, and a CPU 30e.

Two RF signals from the RF signal processing section 22, that is, the (A+D) signal and the (B+C) signal are both supplied to the peak hold circuit 30a and to the bottom hold circuit 30b.

The peak hold circuit 30a holds the peak values of two input RF signals at the timing of the address information based on an ID gate signal supplied from the controller 20 and supplies the peak values to the A/D converter 30c. The A/D converter 30c converts the input peak value into a digital value and supplies the digitized peak value to the CPU 30e. The peak value of the address information signal contained in the (A+D) signal and the peak value of the address information signal contained in the (B+C) signal are supplied to the CPU 30e.

The bottom hold circuit 30b holds the bottom values of two RF signals at the timing of the address information based on an ID gate signal supplied from the controller 20 and supplies the bottom values to the A/D converter 30d. The A/D converter 30d converts the input bottom value into a digital value and supplies the digitized bottom value to the CPU 30e. The bottom value of the address information signal contained in the (A+D) signal and the bottom value of the address information signal contained in the (B+C) signal are supplied to the CPU 30e.

The CPU 30e, for example, when on the land, calculates the difference between the peak and bottom values of the (A+D) signal, that is, the amplitude of the address information signal of ID1 and ID2 and the difference between the peak and bottom values of the (B+C) signal, that is, the amplitude of the address information signal of ID3 and ID4, and compares these difference values. Based on the comparison result, the CPU 30e determines whether to use the summation signal or to use the difference signal and supplies the determination to the controller 20. More specifically, the CPU 30e calculates a ratio between the amplitude of the signal of ID1 and ID2 and the amplitude of the signal of ID3 and ID4. When this ratio is greater than or equal to a predetermined value, the CPU 30e determines that a difference has occurred in the amplitudes of the two signals due to a focus deviation and that the summation signal should be used rather than the difference signal. For the case of the groove, the (A+D) signal corresponds to ID3 and ID4 and the (B+C) signal corresponds to ID1 and ID2.

Figure 3:
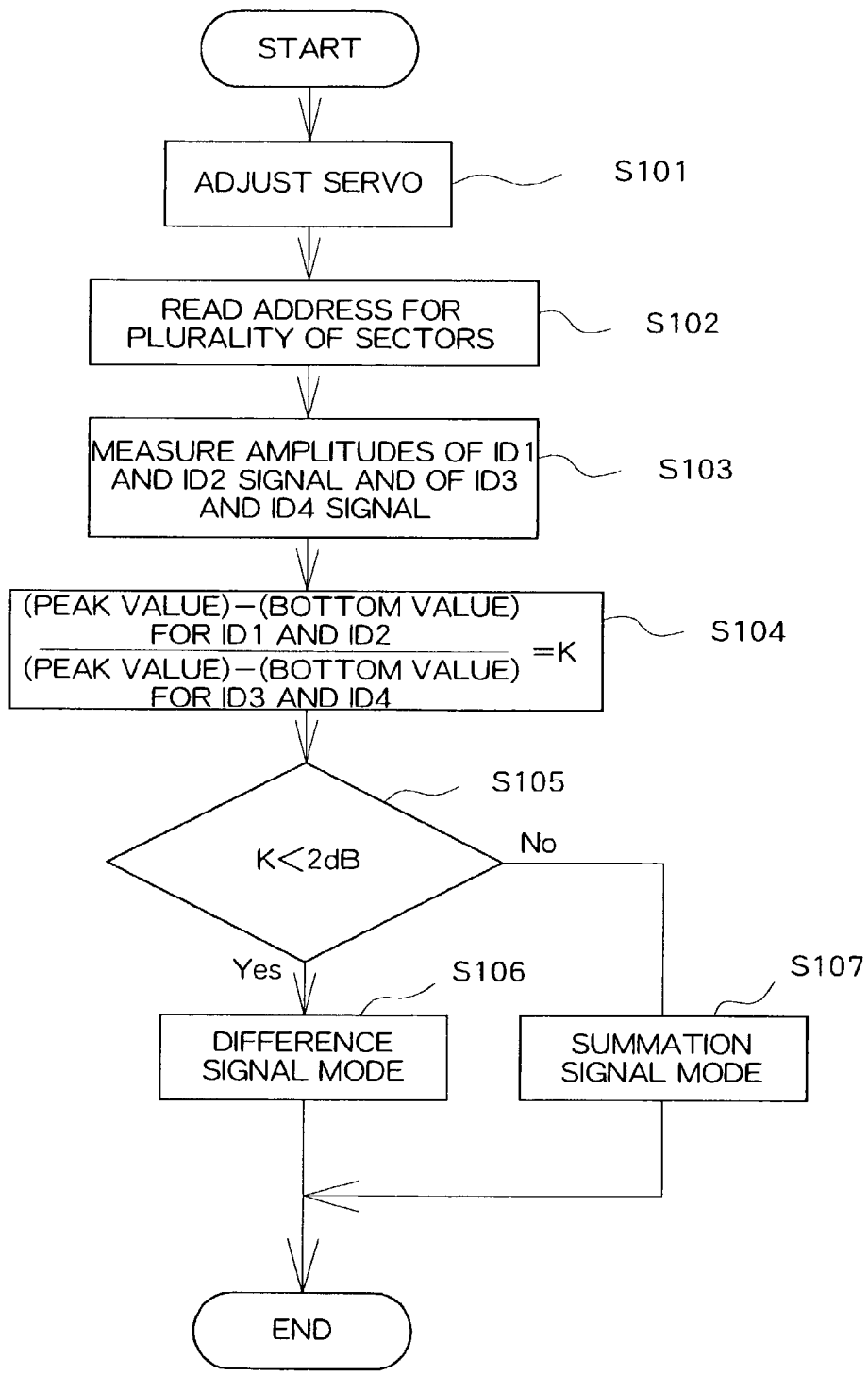
FIG. 3 is a flowchart showing a process for reproducing address information.

FIG. 3 is a flowchart showing a process in the present embodiment. First, an optical disk 10 such as a DVD-RAM is equipped onto a drive (optical disk device). Then, a disk ID stored in a predetermined region of the optical disk 10 is read and the focus offset and tracking offset are set to enable adjustment of the focus servo and tracking servo (step S101). Next, the optical pickup 14 is moved to a predetermined track (the innermost track or the outermost track) on the optical disk 10 and address information for a plurality of sectors are read (step S102), the number of sectors to be read being determined in advance. For example, 25 sectors can be read in one track. As described above, one sector includes 4 address information items ID1–ID4, and thus, in 25 sectors, a total of 100 address information items are contained.

The amplitude of the read address information ID1 and ID2 and the amplitude of the read address information ID3 and ID4 are measured (step S103). More specifically, because 25 ID1 address information items and 25 ID2 address information items are available, the average amplitude of the 25 ID1 address information signals and the average amplitude of the 25 ID2 address information signals are calculated, and then, the average of the two average amplitudes is calculated as the average amplitude for ID1 and ID2. Similarly, by calculating the average amplitude of 25 ID3 signals and the average amplitude of 25 ID4 signals, the average amplitude of ID3 and ID4 can be calculated.

After the average amplitudes are calculated, the CPU 30e of the mode determining section 30 calculates the ratio K between the two amplitudes using the following equation (step S104).

$$K = (\text{amplitude of ID1 and ID2})/(\text{amplitude of ID3 and ID4})$$

The CPU 30*e* then judges whether or not the ratio K is less than a predetermined value, such as, for example, 2 dB (step S105). When the ratio K of the amplitudes is greater than or equal to the predetermined value, the CPU 30*e* judges that the spot shape of the laser light is deformed due to a focus deviation and sets the mode to the summation signal mode (step S107). When, on the other hand, the ratio K of the amplitudes is less than the predetermined value, the CPU 30*e* judges that no focus deviation is present (or that a focus deviation of a degree that does not have a significant influence is present), and sets the mode to the difference signal mode (step 5106). After selecting the summation signal mode or the difference signal mode based on the ratio of the amplitudes, address information is reproduced in the selected mode.

As described, in the present embodiment, when the amplitudes of the signal of ID1 and ID2 and of the signal of ID3 and ID4 differ from each other due to a focus deviation, the address information is reproduced using a summation signal of (A+D) and (B+C) signals. Because of this, it is possible to reliably obtain the address information regardless of focus deviation and to reliably write and reproduce data.

Figure 4:
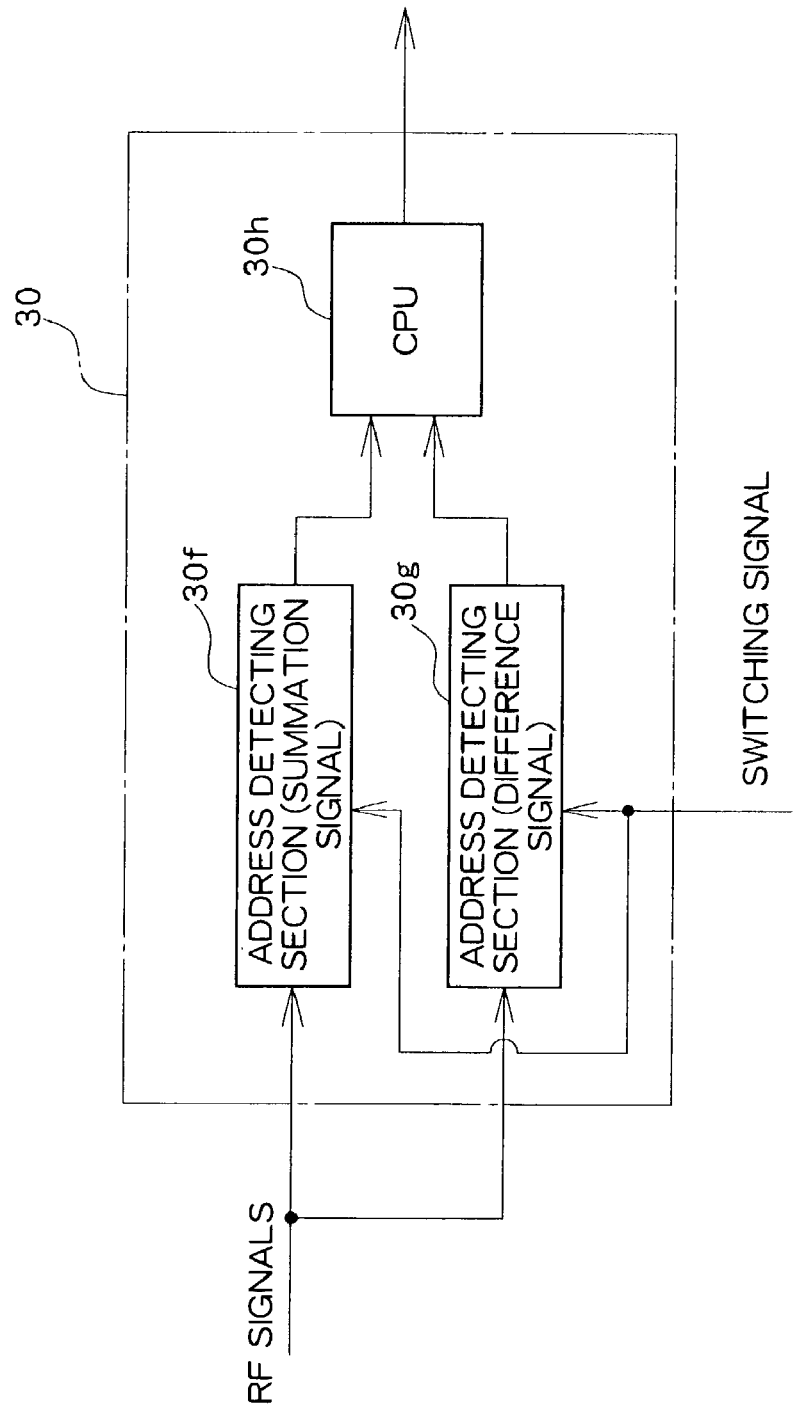
FIG. 4 is a structural block diagram showing another structure for the mode determining section shown in FIG. 1.

FIG. 4 is a block diagram showing another possible structure of the mode determining section 30.

The mode determining section 30 shown on FIG. 4 comprises an address detecting section 30*f* for summation signal mode, an address detecting section 30*g* for difference signal mode, and a CPU 30*h*.

Two signals from the RF signal processing section 22, that is, the (A+D) signal and the (B+C) signal, are both supplied to the address detecting sections 30*f* and 30*g*.

The address detecting section 30*f* comprises a decoder, and detects address information from a signal representing (A+D)+(B+C), that is, the summation signal, for a plurality of sectors, and supplies the detected address information to the CPU 30*h*.

Similarly, the address detecting section 30*g* comprises a decoder, and detects address information from a signal representing (A+D)−(B+C), that is, the difference signal, for a plurality of sectors, and supplies the detected address information to the CPU 30*h*.

The CPU 30*h* compares the number of detected addresses for the summation signal mode with the number of detected addresses for the difference signal mode, selects the mode with greater number of detected addresses, and supplies the selected mode to the controller 20 as the determination.

Figure 5:
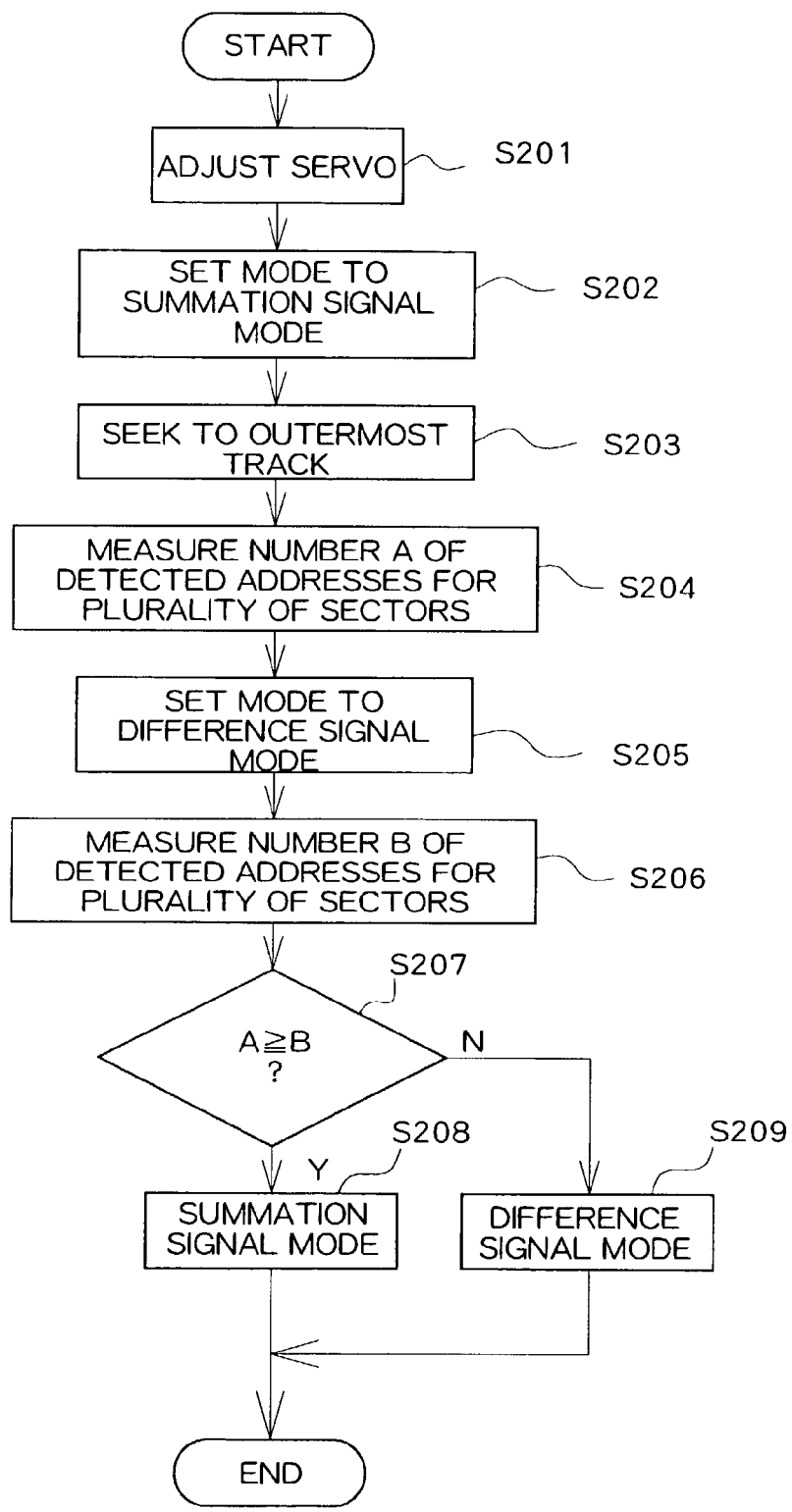
FIG. 5 is a flowchart showing another process for reproducing address information.

FIG. 5 is a flowchart showing this process. First, an optical disk 10 is equipped on a drive. The disk ID is read and the focus servo and tracking servo are adjusted (step S201). Then, the device is set in a summation signal mode, that is, the address detecting section 30*f* is switched on (step S202), and the optical pickup 14 is moved to (seeks) the outermost track of the optical disk 10 (step S203). The optical pickup 14 is moved to the outermost track because it is assumed that the inclination (tilt) between the optical disk 10 and the optical axis of the laser light will become greater as the distance from the center is increased.

After the optical pickup 14 is moved to the outermost track, a number A of detected addresses for a plurality of sectors (for example, 10 sectors) is measured (step S204). A total of 4×10=40 address information items are present in 10 sectors, and therefore, it is also possible to calculate A/40 as a fraction of detected address information items.

After the number A of detected addresses in the summation signal mode is calculated, the device is set in the difference signal mode, that is, the address detecting section 30*g* is switched on (step S205). With a process similar to the above process, a number B of detected addresses for the same number of sectors (10 sectors in this example) is measured (step S206). In this step, similar to step S204, it is also possible to calculate B/40 as a fraction of detected address information items.

After the numbers A and B of detected addresses for summation signal mode and for difference signal mode are measured, the CPU 30*h* compares the numbers A and B of detected addresses for the two modes and judges whether or not A is greater than or equal to B (A^B) (step S207). When A is greater than or equal to B (A^B), the CPU 30*h* judges that the address information can be better detected in the summation signal mode and sets the mode to the summation signal mode (step S208). When, on the other hand, A is less than B (A<B), the CPU 30*h* judges that the address information can be better detected in the difference signal mode and sets the mode to the difference signal mode (step S209). After the mode is set to either the summation signal mode or the difference signal mode, the optical pickup 14 is moved to a predetermined position, address information is reproduced using the selected mode, and data is written or reproduced.

As described, because the mode in which the address can be better detected is selected from the summation signal mode and the difference signal mode and is set for reproducing address information, it is possible to reliably reproduce the address information even in conditions where a focus deviation or a tilt is present.

When there is a tilt as shown in FIG. 11, in general, A is less than B (A<B), and thus, the difference signal mode is selected and the address information is reproduced using the difference signal. In this case, on the land, address information is reproduced with the polarity of the ID3 and ID4 signal inverted. Similarly, on the groove, address information is reproduced with the polarity of the ID1 and ID2 signal inverted.

Figure 6:
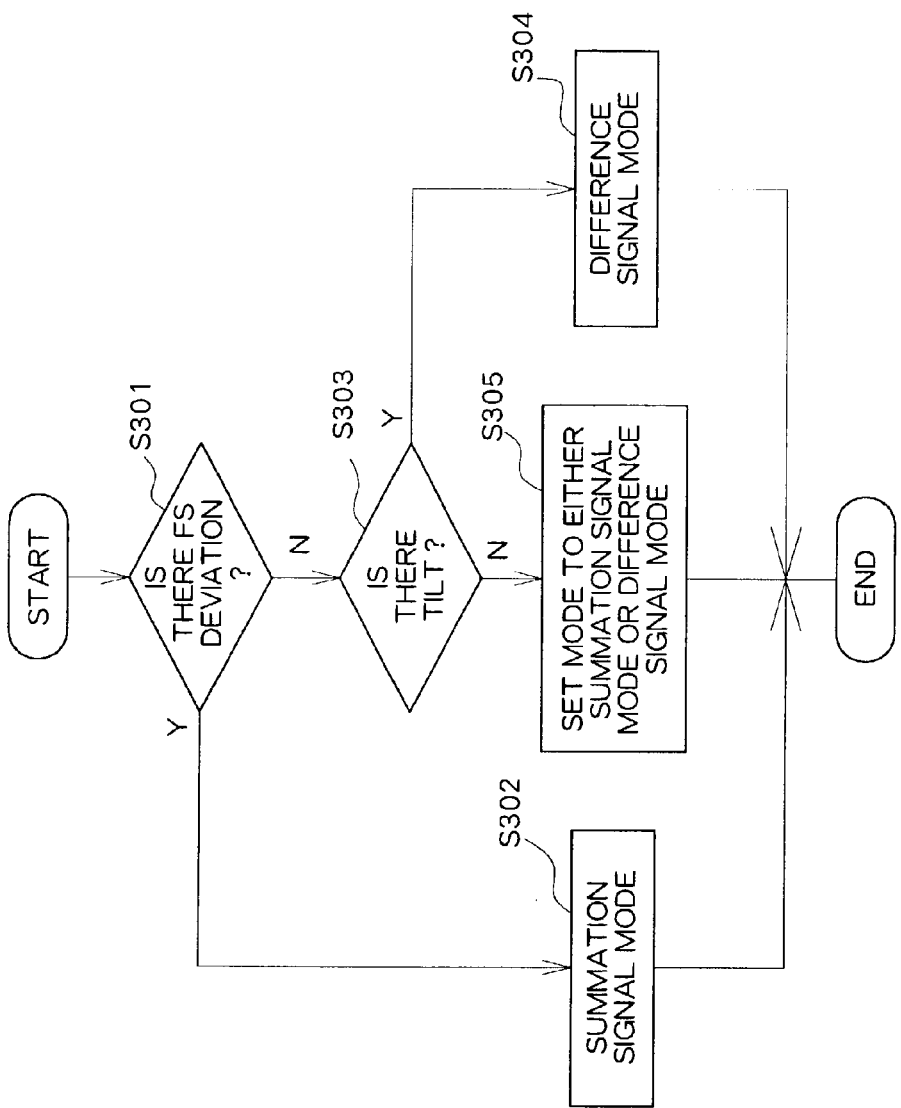
FIG. 6 is a flowchart showing yet another process for reproducing address information.

FIG. 6 is a flowchart showing another process of the mode determining section 30. The mode determining section 30 may comprise a sensor for detecting focus deviation, a sensor for detecting the amount of tilt, and a CPU. As the sensor for detecting focus deviation, for example, a sensor can be used which detects a change in the quality of the reproduced signal (for example, jitter value) caused by the focus deviation. The sensor can detect the amount of focus deviation by, for example, taking advantage of the fact that jitter value is increased by the focus deviation. As the tilt sensor, a structure can be employed which comprises a photodetector which irradiates laser light onto an optical disk 10 and detects the return light, and which is configured such that, when there is no tilt, the amounts of return light entering two detectors of the photodetector are equal and when there is a tilt, a difference is created between the amounts of light entering the two detectors. A difference signal of the signals from the two detectors can be used as the tilt signal. It should be noted that any other sensor for detecting focus deviation and/or any other sensor for detecting tilt may be used.

The detection signals from the focus deviation sensor and tilt sensor are supplied to the CPU. The CPU compares the amount of focus deviation and the amount of tilt each with respective threshold values, selects one of the summation signal mode and difference signal mode based on the magnitude relationship, and supplies the selection to the controller 20.

In FIG. 6, first, it is determined whether or not there is a focus deviation (step S301). This determination is made by comparing the amount of deviation detected by the focus deviation sensor with a predetermined threshold value. When the amount of focus deviation is greater than or equal to the threshold value and the CPU determines that there is a focus deviation, the CPU sets the mode to the summation signal mode (step S302). On the other hand, when the CPU determines that no focus deviation is present, the CPU then determines whether or not a tilt is present (step S303) Similar to the above determination, this determination of tilt is performed by comparing the detected amount of tilt from the tilt sensor with a predetermined threshold value. When the CPU determines that there is a tilt, the CPU sets the mode to the difference signal mode (step S304).

On the other hand, when there is neither focus deviation nor tilt, the CPU sets the mode to either the summation signal mode or the difference signal mode (step S305). For example, when there is neither focus deviation nor tilt, the CPU sets the mode to the summation signal mode.

In this case, the address information is reproduced using the difference signal only when there is a tilt and is reproduced using the summation signal in all other circumstances.

By selectively switching between the summation signal mode and the difference signal mode depending on the presence of focus deviation and on the presence of tilt as described, it is possible to reliably reproduce the address information independently of the relationship between the optical disk 10 and optical pickup 14.

The process shown in the flowchart of FIG. 6 may be performed only one time after the optical disk 10 is equipped on the optical disk device. In this case, the presence of the focus deviation and the presence of the tilt can be detected at the outermost track of the optical disk 10. Alternatively, the process of FIG. 6 may be performed a plurality of times while writing or reading data through an interruption process at a predetermined timing.

In the present embodiment, the focus deviation and tilt are detected by providing a focus deviation sensor and a tilt sensor. It is also possible, however, to detect the focus deviation and tilt condition by processing the replay RF signals so that the device structure can be simplified. More specifically, for an optical disk device having a function to optimize the writing power by executing OPC (Optimum Power Control) using a jitter value, because a jitter value measuring circuit is already present, this circuit may be used to also function as the focus deviation sensor. Also, because the amount of return light to the optical pickup 14 in a condition where no pit is formed (for example, level A) reflects the amount of tilt, it is possible to realize the tilt sensing function by monitoring the amount of return light.

Although preferred embodiments of the present invention have been described, the present invention is not limited to these configurations, and various modifications can be made.

For example, it is possible to calculate the number of detected addresses for summation signal and difference signal in each zone of an optical disk and to determine whether to use the summation signal or the difference signal for each zone. It is also possible to determine whether to use the summation signal or the difference signal for each information track.

It is also possible, for example, to set the summation signal mode as the default mode and to switch to the difference signal mode for replaying address information when the address detection rate is decreased.

In this case, the mode determining section 30 can be configured to include a comparator for constantly comparing the number of detected addresses with a predetermined threshold value and to supply a signal to the controller 20 for switching from the summation signal mode to the difference signal mode when the number of detected addresses using the summation signal is reduced to a value less than the threshold value. Alternatively, it is also possible to set the difference signal mode as the default mode and to switch to the summation signal mode based on the number of detected addresses.

What is claimed is:

1. An optical disk device comprising:

an optical pickup for irradiating laser light onto an optical disk and receiving the return light from said optical disk by four-segment photodetectors;

a mode determining circuit for supplying a switching signal during reading or writing of said optical disk; and an address reproducing circuit for selectively switching between a summation signal mode and a difference signal mode of two signals from photodetectors split into two components along the radial direction among said four-segment photodetectors based on said switching signal and for reproducing address information of said optical disk;

wherein said mode determining circuit detects said address information by comparing the number of detected addresses for the summation signal mode with the number of detected addresses for the difference signal mode, and supplies said switching signal based on the mode with a greater number of detected addresses.

* * * * *